United States Patent
Mao et al.

(10) Patent No.: US 11,655,412 B2
(45) Date of Patent: May 23, 2023

(54) SPHERICAL ORGANIC NANO BORON CROSSLINKER WITH PAMAM CORE AND PREPARATION METHOD THEREOF, AND GEL FRACTURING FLUID

(71) Applicants: Southwest Petroleum University, Chengdu (CN); Sichuan Green & Top Technology Co., Ltd, Chengdu (CN)

(72) Inventors: Jincheng Mao, Chengdu (CN); Jinhua Mao, Chengdu (CN); Xiaojiang Yang, Chengdu (CN); Chong Lin, Chengdu (CN); Yang Zhang, Chengdu (CN); An Chen, Chengdu (CN); Sikai Dai, Chengdu (CN)

(73) Assignees: Southwest Petroleum University, Chengdu (CN); Sichuan Green & Top Technology Co., Ltd, Chengdu (CN)

( * ) Notice: Subject to any disclaimer, the term of this patent is extended or adjusted under 35 U.S.C. 154(b) by 0 days.

(21) Appl. No.: 17/749,504

(22) Filed: May 20, 2022

(65) Prior Publication Data
US 2022/0275269 A1   Sep. 1, 2022

(30) Foreign Application Priority Data
Jan. 17, 2022   (CN) .......................... 202210048107.8

(51) Int. Cl.
*C09K 8/68* (2006.01)
*C07F 5/02* (2006.01)
*C09K 8/70* (2006.01)

(52) U.S. Cl.
CPC .............. *C09K 8/685* (2013.01); *C07F 5/022* (2013.01); *C09K 8/70* (2013.01)

(58) Field of Classification Search
None
See application file for complete search history.

(56) References Cited

U.S. PATENT DOCUMENTS

| 10,604,694 | B1 * | 3/2020 | Berger ...................... C09K 8/28 |
| 2009/0151937 | A1 * | 6/2009 | Goodwin ............ E21B 33/1208 166/57 |
| 2017/0240803 | A1 * | 8/2017 | Chopade ............... E21B 43/267 |

FOREIGN PATENT DOCUMENTS

| AU | 2015409574 A1 | 2/2018 |
| CN | 104497220 B | 2/2017 |
| CN | 110295035 B | 8/2021 |

* cited by examiner

*Primary Examiner* — John J Figueroa

(57) ABSTRACT

A spherical organic nano boron crosslinker with a PAMAM core and a preparation method thereof, and a gel fracturing fluid. A chemical structure of the spherical organic nano boron crosslinker is shown as follows:

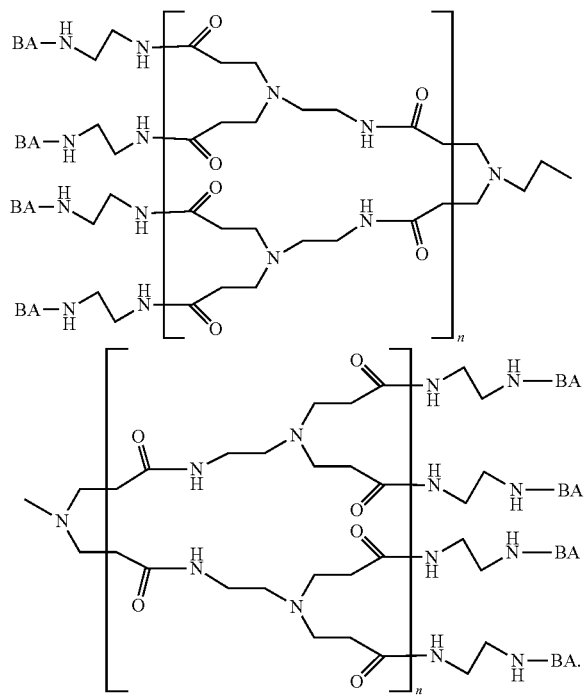

In the formula, n=0, 1, 2 or 3; and

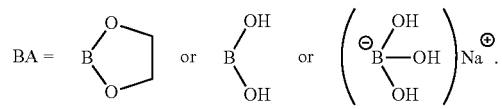

10 Claims, 5 Drawing Sheets

SPHERICAL ORGANIC NANO BORON CROSSLINKER WITH PAMAM CORE AND PREPARATION METHOD THEREOF, AND GEL FRACTURING FLUID

CROSS-REFERENCE TO RELATED APPLICATIONS

This application claims the benefit of priority from Chinese Patent Application No. 202210048107.8, filed on Jan. 17, 2022. The content of the aforementioned application, including any intervening amendments thereto, is incorporated herein by reference in its entirety.

TECHNICAL FIELD

The present disclosure relates to fracturing fluid, in particular to a spherical organic nano boron crosslinker with a polyamidoamine (PAMAM) core and a preparation method thereof, and a gel fracturing fluid.

BACKGROUND

Hydraulic fracturing in low-permeability reservoirs and medium-high permeability reservoirs can not only improve the fracture conductivity, but also reduce the seepage resistance of fluids in the near-wellbore area and changes the seepage state of the fluids, so as to boost the well production. Therefore, the hydraulic fracturing is commonly employed as a reservoir modification technique in the oil-gas exploitation. With the continuous exploitation of the unconventional oil-gas resources such as oil shale, shale gas and coalbed methane in China, the hydraulic fracturing technology has achieved desirable results in the field and has now become one of the indispensable measures to boost the production of oil-gas resources, where the fracturing fluid is the key of this technology.

During the fracturing reformation, considering that the fracturing fluid plays a vital role in the formation fracturing, proppant transportation and fracture extension, the properties of the fracturing fluid are closely related to the fracturing reformation effect. The core components of the fracturing fluids are the thickener and the crosslinker, where the boron-crosslinked guar gum fracturing fluid is the most widely applied fracturing fluid system currently. Nevertheless, with the continuous exploitation of the deep oil-gas resources and the unconventional oil-gas resources, higher and higher requirements are raised for the properties of the fracturing fluids in the field application. Regarding the conventional guar gum fracturing fluid system, the enhancement of temperature resistance and sand-carrying capacity is achieved mainly by increasing the thickener concentration or introducing a metal crosslinker. However, in addition to bringing difficulties to the transportation of fracturing fluid, the higher concentration of thickener also produces more residues after the gel breaking of the fracturing fluid, causing serious damage to the formation. Though the metal crosslinker can effectively improve the temperature resistance of the guar gum fracturing fluid, the crosslinking effect between the metal ions and the guar gum is extremely strong (generally considered as a permanent crosslinking), which will make the crosslinked fracturing fluid have poorer shearing resistance and bring difficulty in the gel breaking, causing great damage to the reservoir.

As a result, it is urgently required to develop a more efficient crosslinker to reduce the usage of the guar gum, so as to effectively cut down the cost of the fracturing fluid and significantly attenuate the damage of the fracturing fluid to the formation.

SUMMARY

An objective of this application is to provide a spherical organic nano boron crosslinker with a polyamidoamine (PAMAM) core, a preparation method thereof and an application thereof in a low-concentration guar gum fracturing fluid to solve the problems of poor temperature resistance, large consumption and serious damage to the formation in the existing guar gum fracturing fluid systems.

Technical solutions of this application are described as follows.

In a first aspect, this application provides a spherical organic nano boron crosslinker with a polyamidoamine (PAMAM) core, wherein a chemical structure of the spherical organic nano boron crosslinker is shown as follows:

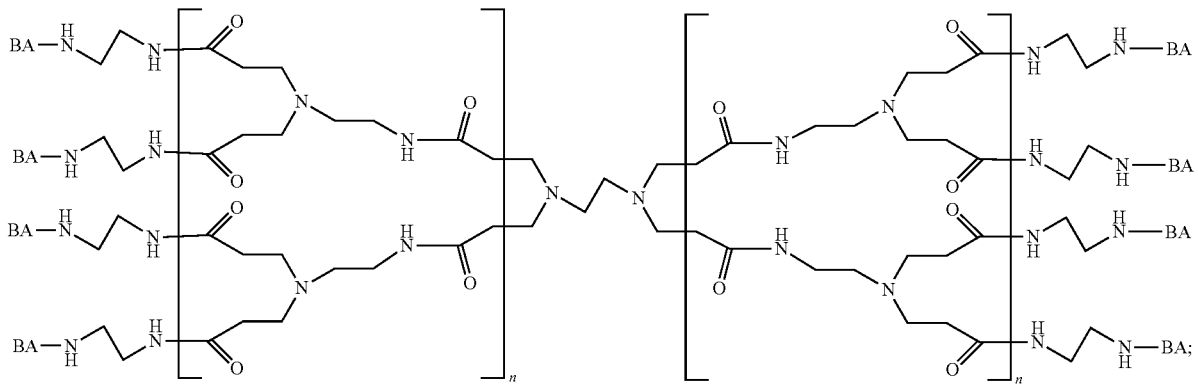

wherein n=0, 1, 2 or 3; and

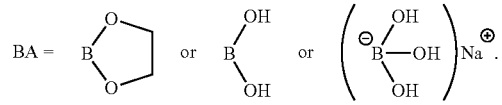

The spherical organic nano boron crosslinker with the PAMAM core has a spherical nano-sized molecular structure with multiple crosslinking sites, allowing for a high crosslinking efficiency.

In a second aspect, this application provides a method of preparing the spherical organic nano boron crosslinker, comprising:

(S1) preparation of intermediate A mixing a boride with ethylene glycol followed by refluxing under stirring until no water is generated to obtain a reaction mixture, wherein a molar ratio of the boride to ethylene glycol is 1:(2-10); and cooling the reaction mixture to room temperature to obtain an intermediate A;

(S2) preparation of PAMAM dendrimer subjecting ethylenediamine (EDA) or a first whole-generation PAMAM as a central core to Michael addition reaction with methyl acrylate (MA) to prepare a half-generation PAMAM;

(S3) preparation of whole-generation PAMAM subjecting the half-generation PAMAM and EDA to an amidation reaction to prepare a second whole-generation PAMAM; and (S4) preparation of the spherical organic nano boron crosslinker reacting the second whole-generation PAMAM with the intermediate A followed by treatment with sodium hydroxide to prepare the spherical organic nano boron crosslinker.

With respect to the above spherical organic nano boron crosslinker, ethylenediamine or a whole-generation PAMAM is adopted as the central core, and the whole-generation PAMAM is a generation 1.0 (G1.0) PAMAM, a G2.0 PAMAM, a G3.0 PAMAM or a G4.0 PAMAM. The G1.0 PAMAM is used as the raw material to undergo the Michael addition reaction with MA to produce a G1.5 PAMAM, which is then subjected to the amidation reaction with EDA to produce the G2.0 PAMAM. By iterating these processes, the G3.0 PAMAM and the G4.0 PAMAM are prepared. Then, the desired whole-generation PAMAM is reacted with the intermediate A, and the reaction product is treated with sodium hydroxide to prepare the spherical organic nano boron crosslinker with a PAMAM core.

In an embodiment, the PAMAM is specifically prepared through the following steps:

subjecting EDA as a central core to Michael addition reaction with MA to obtain a G0.5 PAMAM with an ester group as an terminal group; subjecting the G0.5 PAMAM and EDA to the amidation reaction to prepare PAMAM-1 (G1.0) with an amino group as the terminal group; subjecting the PAMAM-1 as a core to Michael addition reaction with MA to obtain a G1.5 PAMAM; subjecting the G1.5 PAMAM and EDA to the amidation reaction to prepare PAMAM-2 (G2.0); repeating the Michael addition reaction and the amidation reaction with the PAMAM-2 as a core to synthesize PAMAM-3; and repeating the Michael addition reaction and the amidation reaction with the PAMAM-3 as a core to synthesize PAMAM-4.

In some embodiments, it is also possible to iteratively prepare a higher-generation PAMAM (greater than 4 generations) and the corresponding spherical organic nano boron crosslinker according to the preparation method provided herein, which will not be repeated herein.

In an embodiment, in step (S1), the boride is boric acid or borax.

In an embodiment, in step (S2), a molar ratio of the EDA or the first whole-generation PAMAM to the MA is 1:(8-64).

In an embodiment, in step (S3), a molar ratio of the half-generation PAMAM to the EDA is 1:(20-50).

In an embodiment, in step (S4), a molar ratio of the second whole-generation PAMAM to the intermediate A is 1:(4-32).

In an embodiment, in step (S4), the second whole-generation PAMAM is reacted with the intermediate A at 140° C.-150° C. for 3-5 h. A temperature lower than 140° C. is not conducive to the reaction between the second whole-generation PAMAM and the intermediate A. When the temperature is too high, it may cause the oxidation and degradation of the reaction raw materials, as well as the occurrence of side reactions. The reaction time has less effect on the performance of the crosslinker prepared herein, and the reaction can be completed within 3-5 h.

In an embodiment, in step (S4), the second whole-generation PAMAM is reacted with the intermediate A at 150° C. for 4 h. Under such conditions, the gel fracturing fluid containing the prepared crosslinker has the highest apparent viscosity.

In a third aspect, this application provides a gel fracturing fluid comprising the spherical organic nano boron crosslinker described in the first aspect.

The spherical organic nano boron crosslinker with a PAMAM core has high viscosity, desirable shear resistance, low cost, excellent temperature resistance and less residue after gel breaking. Moreover, in the case of low-concentration guar gum, the fracturing fluid containing the spherical organic nano boron crosslinker can still be applicable to the 90° C.-180° C. formations, effectively solving the problems of large usage of the thickener and poor temperature resistance in the existing organic boron crosslinked guar gum fracturing fluids.

In some embodiments, the gel fracturing fluid comprises 0.4 wt %-0.8 wt % of the spherical organic nano boron crosslinker.

In some embodiments, in addition to the spherical organic nano boron crosslinker and water, the gel fracturing fluid further comprises 0.2 wt %-0.5 wt % of a guar gum, where the guar gum is hydroxypropyl guar gum, carboxyl methyl guar gum, carboxylmethyl hydroxypropyl guar gum or a combination thereof.

In some embodiments, the gel fracturing fluid further comprises an additive conventionally adopted in the art, where the additive is a clay stabilizer, a bactericide, a pH regulator or a combination thereof. In an embodiment, the gel fracturing fluid further comprises a gel breaker for gel breaking. The content of these additives can be that conventionally adopted in the art, for example, the gel fracturing fluid comprises 0.5%-1.0% by weight of the clay stabilizer, 0.1%-0.15% by weight of the bactericide and 0.02%-0.1% by weight of the pH regulator, and optionally 0.04%-0.1% by weight of the gel breaker for gel breaking.

In some embodiments, the clay stabilizer may be a variety of clay stabilizers conventionally adopted in the art for fracturing fluids, preferably potassium chloride and/or ammonium chloride.

In some embodiments, the bactericides may be a variety of bactericides conventionally adopted in the art for fracturing fluids, preferably glutaraldehyde, formaldehyde, tetrakis hydroxymethyl phosphonium sulfuric or a combination thereof.

In some embodiments, the pH regulator is an alkaline substance, preferably sodium bicarbonate, sodium hydroxide, potassium hydroxide, sodium carbonate, potassium carbonate, potassium bicarbonate or a combination thereof.

In some embodiments, the gel breaker may be a variety of gel breakers commonly adopted in the art, preferably ammonium persulfate, sodium persulfate, potassium persulfate, an encapsulated gel breaker or a combination thereof.

The gel fracturing fluid has excellent temperature resistance under 180° C., high viscosity and desirable shear resistance. Moreover, on the premise of meeting related performance requirements, the gel fracturing fluid has less consumption of the guar gum, thereby reducing the production of the fracturing fluid residues and attenuating the reservoir damage. Therefore, the gel fracturing fluid of the disclosure can lower the production cost and promote the exploitation efficiency, and thus suitable for the fracturing modification of the medium and low permeability reservoirs Compared with the prior art, this application has the following beneficial effects.

(1) The spherical organic nano boron crosslinker with PAMAM core has multiple crosslinking sites, which brings high crosslinking efficiency, such that the consumption of the guar gum in the gel fracturing fluid can be effectively reduced, thereby attenuating the damage to the formation and crack caused by the guar gum residues and lowering the cost of the fracturing fluid.

(2) The conventional boron crosslinked guar gum fracturing fluid systems generally have an unsatisfactory temperature resistance (below 160° C.), and fail to satisfy the viscosity requirements in the case of low guar gum content. By contrast, the spherical organic nano boron crosslinker provided herein enables the guar gum base fluid to be crosslinked rapidly into gel at a relatively low content. In addition, the prepared gel fracturing fluid still has a viscosity above 60 mPa·s after sheared at 170 s$^{-1}$ and 180° C. for 2 h, indicating an excellent temperature resistance. By means of the spherical organic nano boron crosslinker provided herein, the consumption of the guar gum is significantly reduced.

Described above are merely illustrative of the technical solutions of the disclosure, and are intended to enable those skilled in the art to understand and implement the technical solutions of the disclosure. In order to make the objects, features and advantages of this disclosure better understood, the disclosure will be described below in detail with reference to the embodiments and accompanying drawings.

BRIEF DESCRIPTION OF THE DRAWINGS

In order to clearly explain the technical solutions in the embodiments of the present disclosure or the prior art, the drawings that need to be used in the description of the embodiments of the disclosure or the prior art will be briefly described below. Obviously, illustrated in the drawings are merely some embodiments of the present disclosure. For those of ordinary skill in the art, other drawings can be obtained based on these drawings without paying creative effort.

DETAILED DESCRIPTION OF EMBODIMENTS

Figure 1:
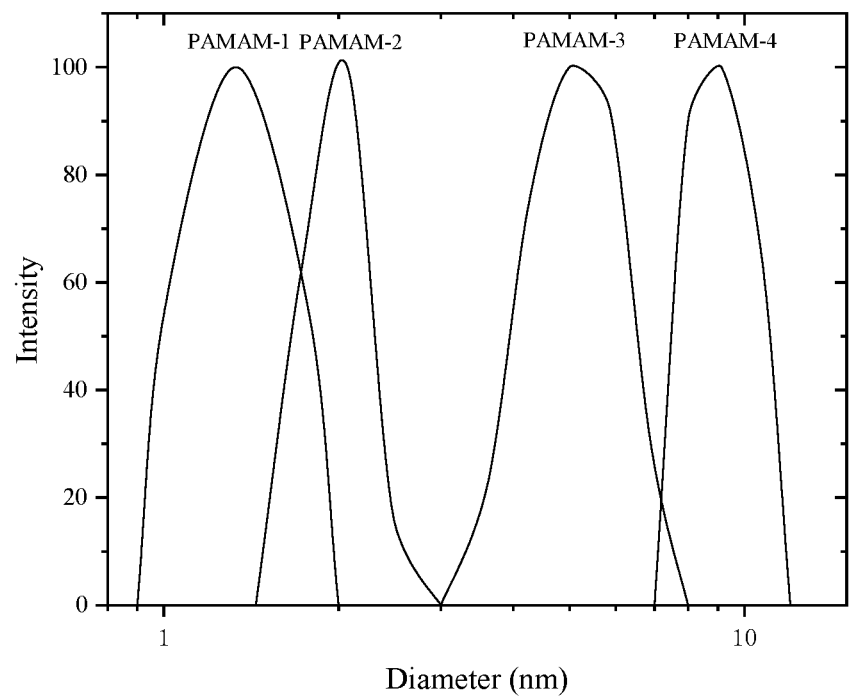
FIG. 1 shows a grain size distribution of PAMAM-1, PAMAM-2, PAMAM-3 and PAMAM-4 spherical organic nano boron crosslinkers.

This application will be described in detail below with reference to the accompanying drawings and embodiments to describe the technical solutions of this application more clearly and completely. Obviously, provided below are merely some embodiments of the present disclosure, which are not intended to limit the disclosure. Other embodiments obtained by those of the ordinary skill in the art based on the embodiments provided herein without paying any creative effort shall fall within the scope of the present disclosure.

As used herein, the term "PAMAM (polyamidoamine)" refers to a polyamide-amine dendrimer, which not only possesses the common characteristics of dendrimers, but also has desirable thermal stability, water solubility, special viscosity and surface tension.

Unless otherwise specified, the test materials and reagents used in the following embodiments are all commercially available. The experimental methods in the following embodiments are conventional methods unless otherwise specified. For example, the raw materials used in the following embodiments include the following components, but is not limited thereto:

boride: boric acid and borax;
alkali: 20 wt % sodium hydroxide aqueous solution;
clay stabilizer: potassium chloride;
bactericide: glutaraldehyde;
pH regulator: sodium bicarbonate;
guar gum: hydroxypropyl guar gum (guar gums containing a cis-ortho-hydroxyl, such as carboxyl methyl guar gum and carboxylmethyl hydroxypropyl guar gum, and derivatives thereof are also feasible); and
gel breaker: ammonium persulfate.

In the following embodiments, the rheological curve of the gel fracturing fluid is measured by a high-temperature and high-pressure HAAKE RS600 rheometer. The viscosity of the gel fracturing fluid after gel breaking and the content of the broken gel residue are measured by the method mentioned in SY/T 5107-2016 "The evaluation measurement for properties of water-based fracturing fluid".

EXAMPLE 1

Preparation of PAMAM-1 Spherical Organic Nano Boron Crosslinker and Gel Fracturing Fluid Containing the Same 1. Preparation of PAMAM-1 Spherical Organic Nano Boron Crosslinker (S1) Preparation of Intermediate A Boric acid and ethylene glycol were added to a three-necked round-bottomed flask equipped with a water separator and a condensing reflux device and refluxed under magnetic stirring until no water was generated to obtain a reaction mixture, where a molar ratio of boric acid to ethylene glycol was 1:4. The reaction mixture was cooled to room temperature to obtain an intermediate A.

(S2) Preparation of Half-Generation PAMAM

Ethylenediamine and methyl acrylate were slowly added to methanol in an ice-water bath under nitrogen protection and then reacted at room temperature for 24 h, where a molar ratio of ethylenediamine to methyl acrylate was 1:8. After that, the reaction mixture was evaporated under reduced pressure to remove the excess methyl acrylate and solvent to obtain a G0.5 PAMAM with an ester group as the terminal group.

(S3) Preparation of Whole-Generation PAMAM

The G0.5 PAMAM and ethylenediamine were slowly added to methanol in an ice-water bath under nitrogen protection and reacted at room temperature for 24 h, where a molar ratio of the G0.5 PAMAM to ethylenediamine was 1:20. After that, the reaction mixture was evaporated under reduced pressure to remove the excess ethylenediamine and solvent to obtain a G1.0 PAMAM (denoted as PAMAM-1).

(S4) Preparation of Spherical Organic Nano Boron Crosslinker

The PAMAM-1 was reacted with the intermediate A at 150° C. for 4 h, where a molar ratio of the PAMAM-1 to the intermediate A was 1:4, and then the reaction product was treated with a 20 wt % sodium hydroxide solution to produce the PAMAM-1 spherical organic nano boron crosslinker, which was structurally shown as follows:

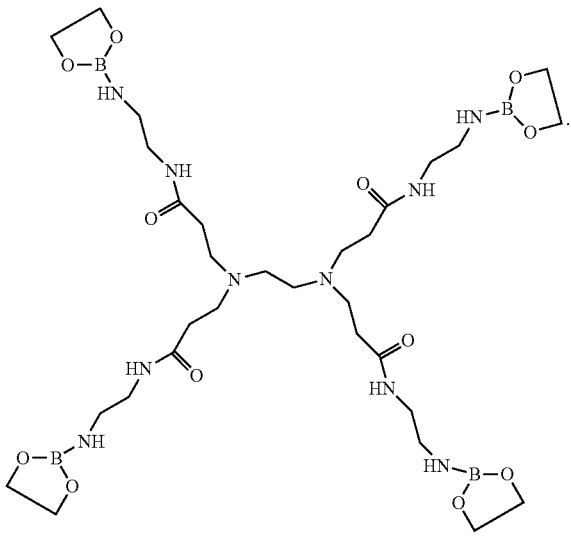 [SMILES: O=C(CCN(CCC(=O)NCCNB1OCCO1)CCN(CCC(=O)NCCNB1OCCO1)CCC(=O)NCCNB1OCCO1)NCCNB1OCCO1]

Referring to FIG. 1, it can be observed that the PAMAM-1 spherical organic nano boron crosslinker was nano-sized.

Figure 2:
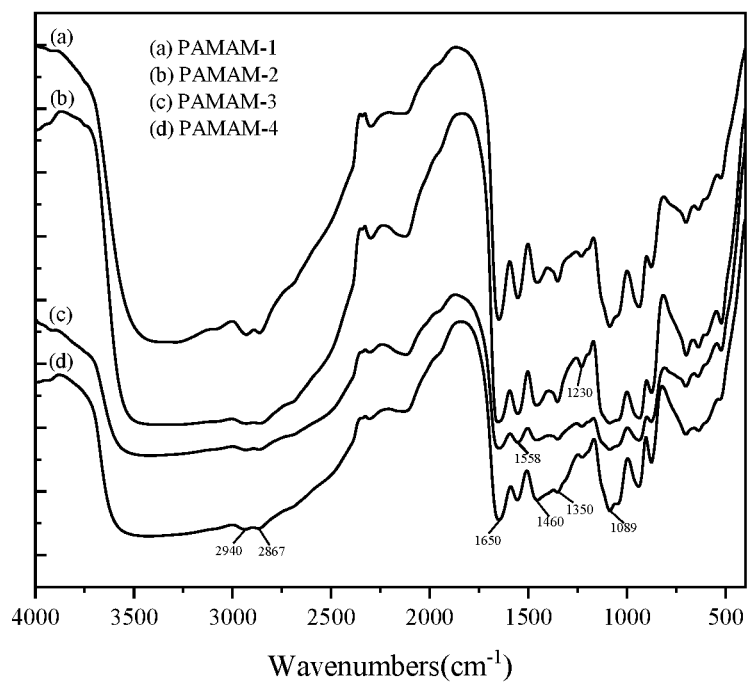
FIG. 2 shows an infrared spectrum of the PAMAM-1, PAMAM-2, PAMAM-3 and PAMAM-4 spherical organic nano boron crosslinkers.

Referring to FIG. 2, it demonstrated that boric acid ester was successfully bound to the PAMAM-1 spherical organic nano boron crosslinker.

2. Preparation of Gel Fracturing Fluid (S1) Preparation of 0.2 wt % Guar Gum Base Fluid 0.2 part by weight of guar gum was slowly added into 99.8 parts by weight of water followed by stirring for 30 min to obtain a guar gum base fluid, which was allowed to stand for swelling.

(S2) After the guar gum was completely swollen, the guar gum base fluid was added with 0.8 wt % of a clay stabilizer, 0.1 wt % of a bactericide and 0.1 wt % of a pH regulator, and then added with 0.4 wt % of the PAMAM-1 spherical organic nano boron crosslinker and evenly mixed to prepare a gel fracturing fluid.

Figure 3:
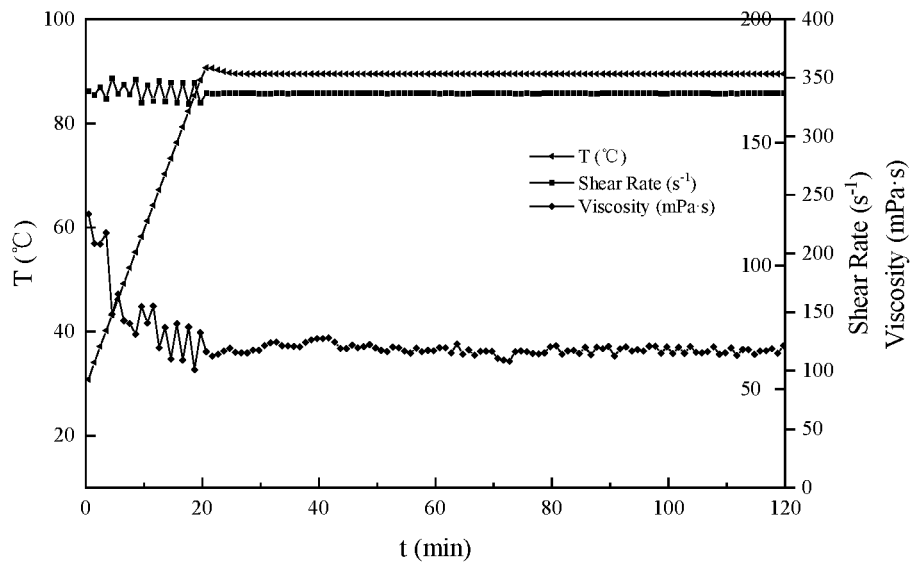
FIG. 3 shows a rheological curve of a gel fracturing fluid prepared according to Example 1 of the present disclosure.

Referring to FIG. 3, it showed that the viscosity of the gel fracturing fluid prepared herein was maintained above 100 mPa·s after sheared at 90° C. and 170 s$^{-1}$ for 120 min, indicating that the gel fracturing fluid can be applied to the site construction.

After the gel breaking at 70° C. in the presence of a gel breaker for 4 h, the viscosity of the fracturing fluid and the residue content were measured, and the results were shown in Table 1.

EXAMPLE 2

Preparation of PAMAM-2 Spherical Organic Nano Boron Crosslinker and Gel Fracturing Fluid Containing the Same 1. Preparation of PAMAM-2 Spherical Organic Nano Boron Crosslinker (S1) Preparation of Intermediate A Boric acid and ethylene glycol were added to a three-necked round-bottomed flask equipped with a water separator and a condensing reflux device and refluxed under magnetic stirring until no water was generated to obtain a reaction mixture, where a molar ratio of boric acid to ethylene glycol was 1:4. The reaction mixture was cooled to room temperature to obtain an intermediate A.

(S2) Preparation of Half-Generation PAMAM

The PAMAM-1 prepared in Example 1 and methyl acrylate were slowly added to methanol in an ice-water bath under nitrogen protection and then reacted at room temperature for 36 h, where a molar ratio of the PAMAM-1 to methyl acrylate was 1:16. After that, the reaction mixture was evaporated under reduced pressure to remove the excess methyl acrylate and solvent to obtain a G1.5 PAMAM with an ester group as the terminal group.

(S3) Preparation of Whole-Generation PAMAM

The G1.5 PAMAM and ethylenediamine were slowly added to methanol in an ice-water bath under nitrogen protection and reacted at room temperature for 36 h, where a molar ratio of the G1.5 PAMAM to ethylenediamine was 1:30. After that, the reaction mixture was evaporated under reduced pressure to remove the excess ethylenediamine and solvent to obtain a G2.0 PAMAM (denoted as PAMAM-2).

(S4) Preparation of Spherical Organic Nano Boron Crosslinker

The PAMAM-2 was reacted with the intermediate A at 150° C. for 4 h, where a molar ratio of the PAMAM-2 to the intermediate A was 1:8, and then the reaction product was treated with a 20 wt % sodium hydroxide solution to produce the PAMAM-2 spherical organic nano boron crosslinker, which was structurally shown as follows:

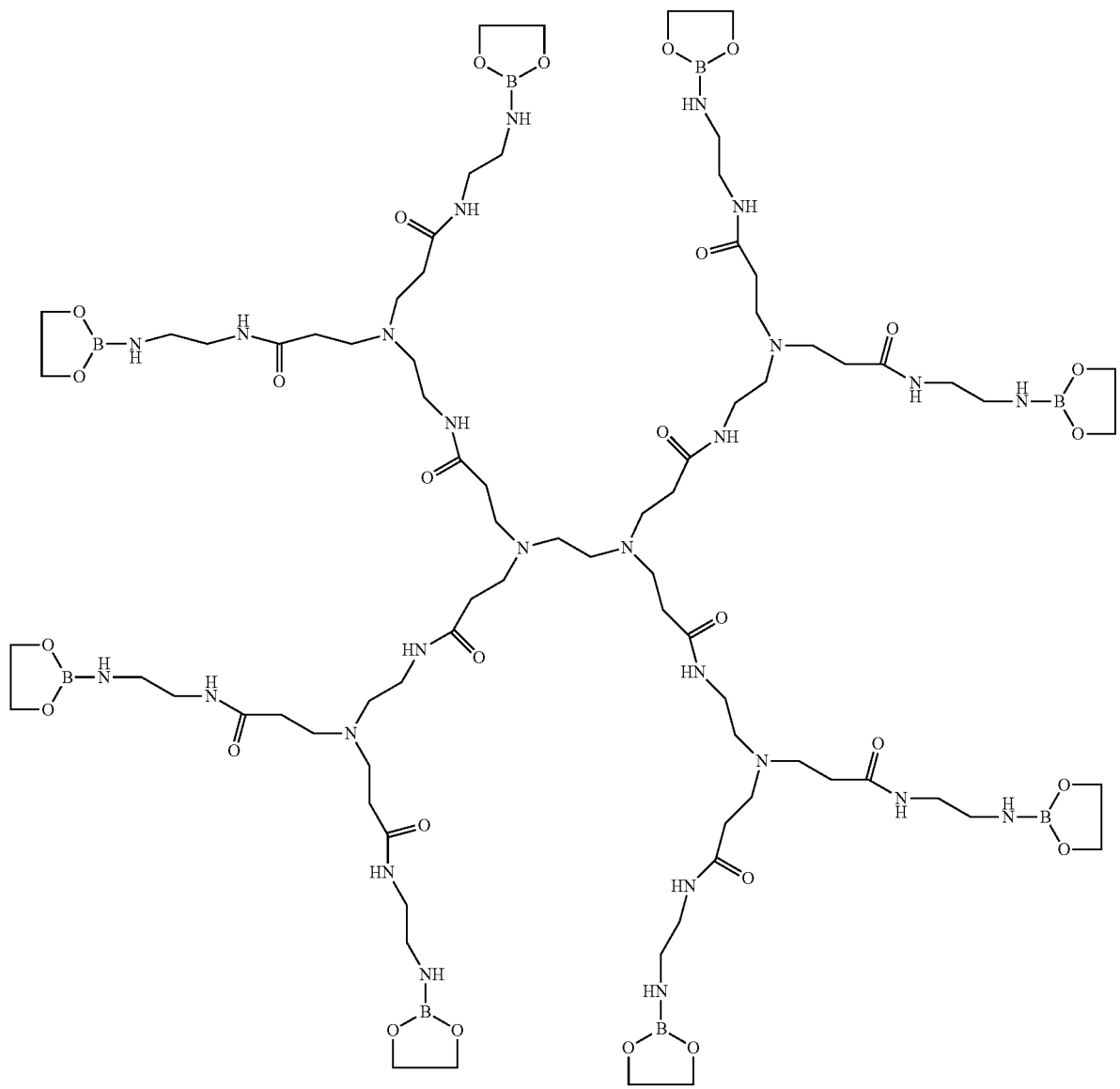 [SMILES: O=C(CCN(CCNC(=O)CCN(CCC(=O)NCCN(CCC(=O)NCCNB1OCCO1)CCC(=O)NCCNB1OCCO1)CCN(CCC(=O)NCCN(CCC(=O)NCCNB1OCCO1)CCC(=O)NCCNB1OCCO1)CCC(=O)NCCN(CCC(=O)NCCNB1OCCO1)CCC(=O)NCCNB1OCCO1)CCC(=O)NCCNB1OCCO1)NCCNB1OCCO1]

Referring to FIG. 1, it can be observed that the PAMAM-2 spherical organic nano boron crosslinker was nano-sized.

Referring to FIG. 2, it demonstrated that boric acid ester was successfully bound to the PAMAM-2 spherical organic nano boron crosslinker.

2. Preparation of Gel Fracturing Fluid (S1) Preparation of 0.25 wt % Guar Gum Base Fluid 0.25 part by weight of guar gum was slowly added into 99.75 parts by weight of water followed by stirring for 30 min to obtain a guar gum base fluid, which was allowed to stand for swelling.

(S2) After the guar gum was completely swollen, the guar gum base fluid was added with 0.8 wt % of a clay stabilizer, 0.1 wt % of a bactericide and 0.1 wt % of a pH regulator, and then added with 0.5 wt % of the PAMAM-2 spherical organic nano boron crosslinker and evenly mixed to prepare a gel fracturing fluid.

Figure 4:
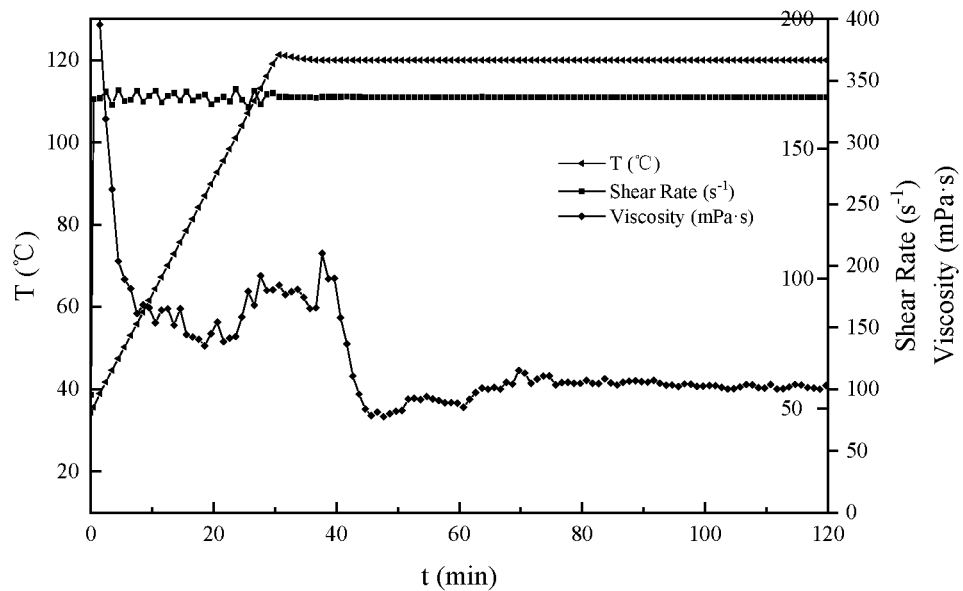
FIG. 4 shows a rheological curve of a gel fracturing fluid prepared according to Example 2 of the present disclosure.

Referring to FIG. 4, it showed that the viscosity of the gel fracturing fluid prepared herein was maintained above 100 mPa·s after sheared at 120° C. and 170 s$^{-1}$ for 120 min, indicating that the gel fracturing fluid can be applied to the site construction.

After the gel breaking at 70° C. in the presence of a gel breaker for 4 h, the viscosity of the fracturing fluid and the residue content were measured, and the results were shown in Table 1.

EXAMPLE 3

Preparation of PAMAM-3 Spherical Organic Nano Boron Crosslinker and Gel Fracturing Fluid Containing the Same 1. Preparation of PAMAM-3 Spherical Organic Nano Boron Crosslinker (S1) Preparation of Intermediate A Boric acid and ethylene glycol were added to a three-necked round-bottomed flask equipped with a water separator and a condensing reflux device and refluxed under magnetic stirring until no water was generated to obtain a reaction mixture, where a molar ratio of boric acid to ethylene glycol was 1:4. The reaction mixture was cooled to room temperature to obtain an intermediate A.

(S2) Preparation of Half-Generation PAMAM

The PAMAM-2 prepared in Example 2 and methyl acrylate were slowly added to methanol in an ice-water bath under nitrogen protection and then reacted at room temperature for 48 h, where a molar ratio of the PAMAM-2 to methyl acrylate was 1:32. After that, the reaction mixture was evaporated under reduced pressure to remove the excess methyl acrylate and solvent to obtain a G2.5 PAMAM with an ester group as the terminal group.

(S3) Preparation of Whole-Generation PAMAM

The G2.5 PAMAM and ethylenediamine were slowly added to methanol in an ice-water bath under nitrogen protection and reacted at room temperature for 48 h, where a molar ratio of the G2.5 PAMAM to ethylenediamine was 1:40. After that, the reaction mixture was evaporated under reduced pressure to remove the excess ethylenediamine and solvent to obtain a G3.0 PAMAM (denoted as PAMAM-3).

(S4) Preparation of Spherical Organic Nano Boron Crosslinker

The PAMAM-3 was reacted with the intermediate A at 150° C. for 4 h, where a molar ratio of the PAMAM-3 to the intermediate A was 1:4, and then the reaction product was treated with a 20 wt % sodium hydroxide solution to produce the PAMAM-3 spherical organic nano boron crosslinker, which was structurally shown as follows:

Referring to FIG. 1, it can be observed that the PAMAM-3 spherical organic nano boron crosslinker is nano-sized.

Referring to FIG. 2, it demonstrated that boric acid ester was successfully bound to the PAMAM-3 spherical organic nano boron crosslinker.

2. Preparation of Gel Fracturing Fluid (S1) Preparation of 0.36 wt % Guar Gum Base Fluid 0.36 part by weight of guar gum was slowly added into 99.64 parts by weight of water followed by stirring for 30 min to obtain a guar gum base fluid, which was allowed to stand for swelling.

(S2) After the guar gum base fluid was completely swollen, the guar gum base fluid was added with 0.8 wt % of a clay stabilizer, 0.1 wt % of a bactericide and 0.1 wt % of a pH regulator, and then added with 0.6 wt % of a PAMAM-3 spherical organic nano boron crosslinker and evenly mixed to prepare a gel fracturing fluid.

Figure 5:
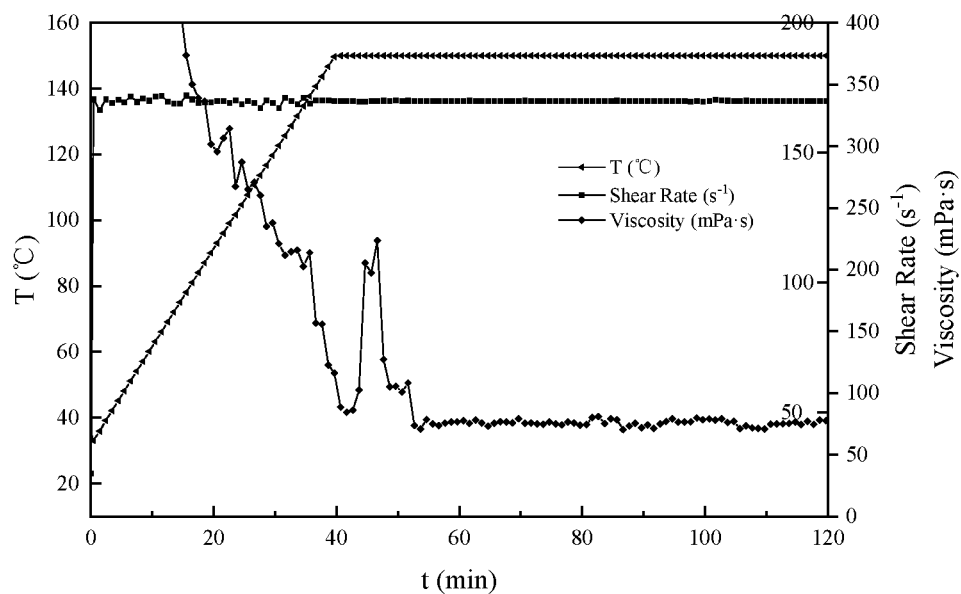
FIG. 5 shows a rheological curve of a gel fracturing fluid prepared according to Example 3 of the present disclosure.

Referring to FIG. 5, it showed that the viscosity of the gel fracturing fluid prepared herein is maintained above 70 mPa·s after sheared at 150° C. and 170 s$^{-1}$ for 120 min, indicating that the gel fracturing fluid can be applied to the site construction.

After the gel breaking at 70° C. in the presence of a gel breaker for 4 h, the viscosity of the fracturing fluid and the residue content were measured, and the results were shown in Table 1.

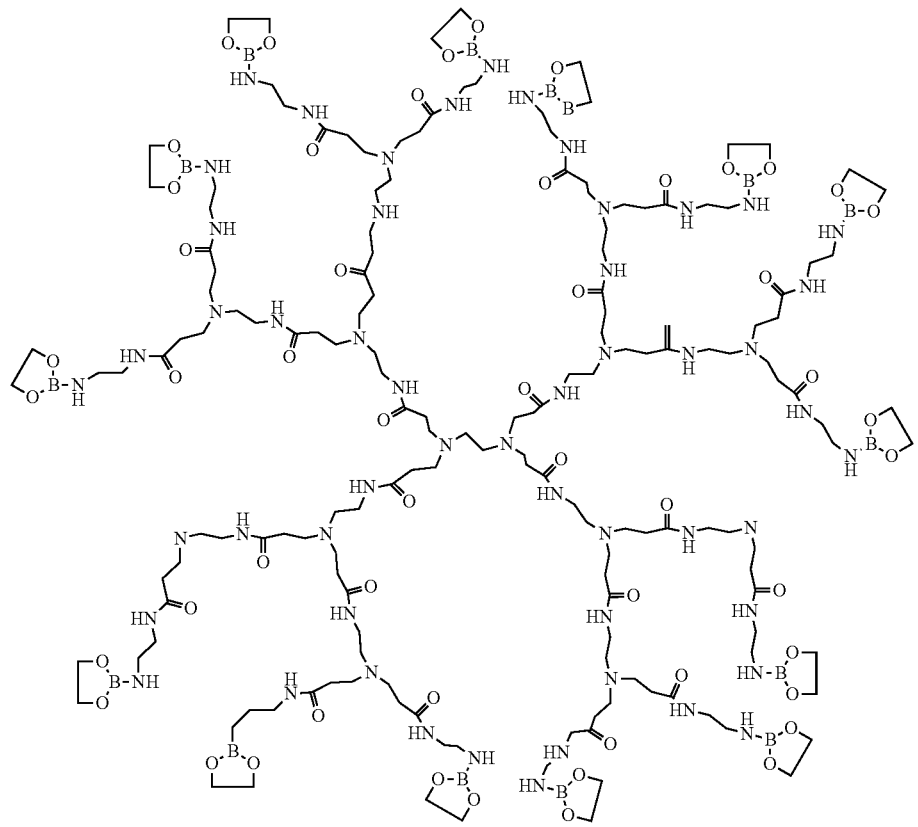

EXAMPLE 4

Preparation of PAMAM-4 Spherical Organic Nano Boron Crosslinker and Gel Fracturing Fluid Containing the Same 1 Preparation of PAMAM-4 Spherical Organic Nano Boron Crosslinker (S1) Preparation of Intermediate A Borax and ethylene glycol were added to a three-necked round-bottomed flask equipped with a water separator and a condensing reflux device and refluxed under magnetic stirring until no water was generated to obtain a reaction mixture, where a molar ratio of borax to ethylene glycol was 1:4. The reaction mixture was cooled to room temperature to obtain an intermediate A.

(S2) Preparation of Half-Generation PAMAM

The PAMAM-3 prepared in Example 3 and methyl acrylate were slowly added to methanol in an ice-water bath under nitrogen protection and then reacted at room temperature for 72 h, where a molar ratio of the PAMAM-3 to methyl acrylate was 1:64. After that, the reaction mixture was evaporated under reduced pressure to remove the excess methyl acrylate and solvent to obtain a G3.5 PAMAM with an ester group as the terminal group.

(S3) Preparation of Whole-Generation PAMAM

The G3.5 PAMAM and ethylenediamine were slowly added to methanol in an ice-water bath under nitrogen protection, and reacted at room temperature for 72 h where a molar ratio of the G3.5 PAMAM central cores to ethylenediamine was 1:50. After that, the reaction mixture was evaporated under reduced pressure to remove the excess ethylenediamine and solvent to obtain a G4.0 PAMAM (denoted as PAMAM-4).

(S4) Preparation of Spherical Organic Nano Boron Crosslinker

The PAMAM-4 was reacted with the intermediate A at 150° C. for 4 h, where a molar ratio of the PAMAM-4 to the intermediate A was 1:4, and then the reaction product was treated with a 20 wt % sodium hydroxide solution to produce the PAMAM-4 spherical organic nano boron crosslinker, which was structurally shown as follows:

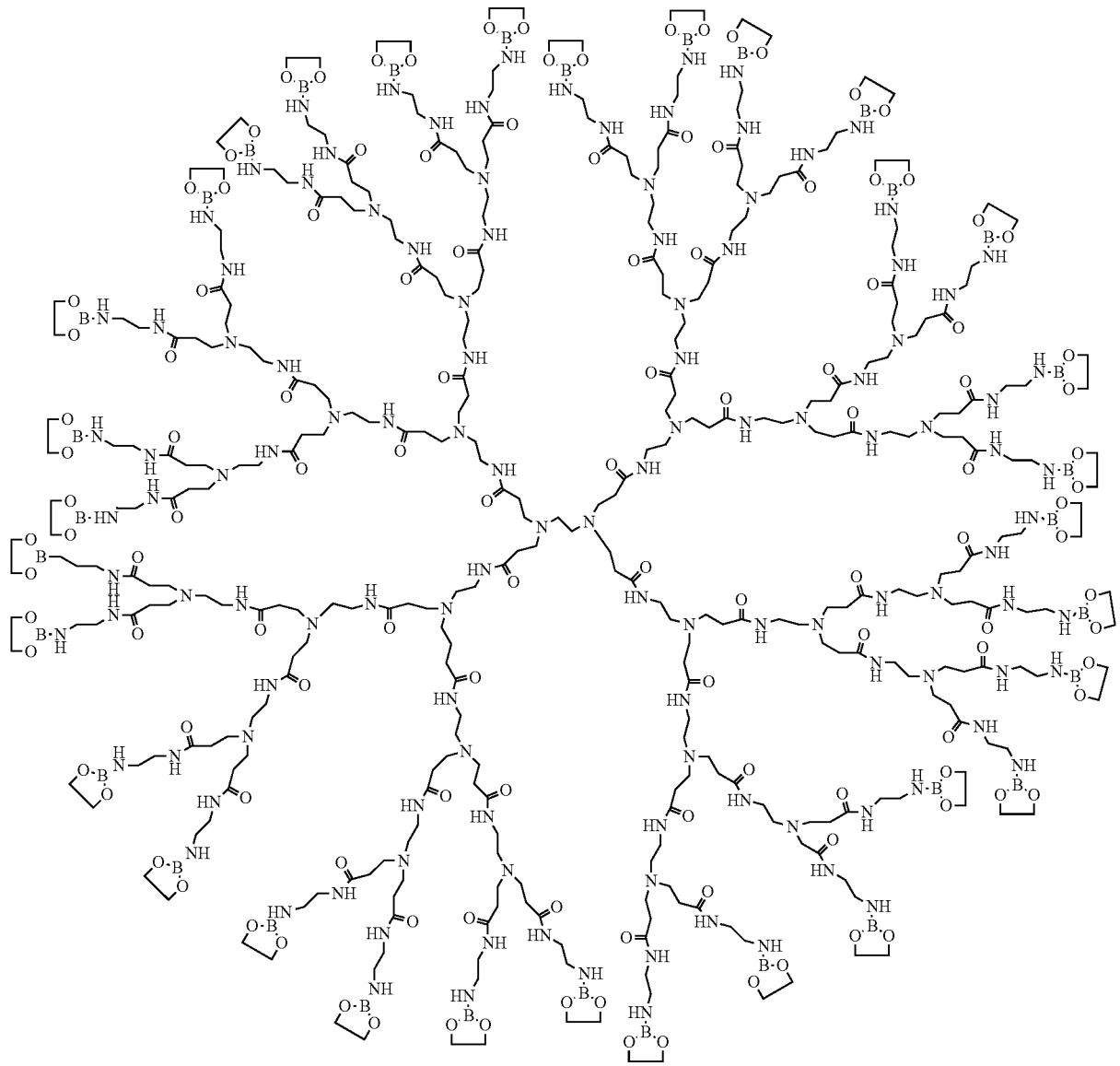

Referring to FIG. 1, it can be observed that the PAMAM-4 spherical organic nano boron crosslinker is nano-sized.

Referring to FIG. 2, it demonstrated that boric acid ester was successfully bound to the PAMAM-4 spherical organic nano boron crosslinker.

2. Preparation of Gel Fracturing Fluid (S1) Preparation of 0.5 wt % Guar Gum Base Fluid 0.5 part by weight of guar gum was slowly added into 99.5 parts by weight of water followed by stirring for 30 min to obtain a guar gum base fluid, which was allowed to stand for swelling.

(S2) After the guar gum was completely swollen, the guar gum base fluid was added with 0.8 wt % of a clay stabilizer, 0.1 wt % of a bactericide and 0.1 wt % of a pH regulator, and then added with 0.8 wt % of the PAMAM-4 spherical organic nano boron crosslinker and evenly mixed to prepare a gel fracturing fluid.

Figure 6:
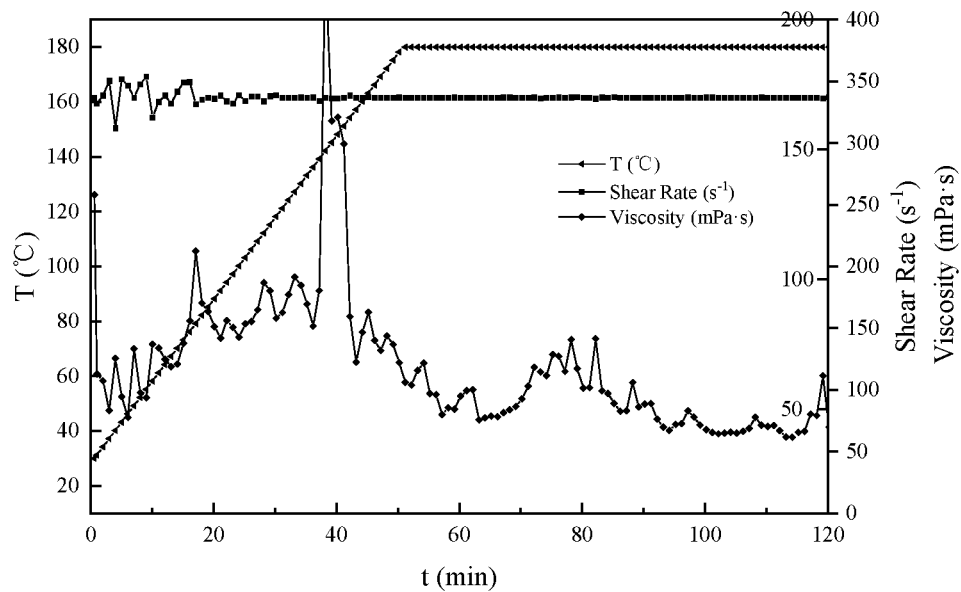
FIG. 6 shows a rheological curve of a gel fracturing fluid prepared according to Example 4 of the present disclosure.

Referring to FIG. 6, it showed that the viscosity of the gel fracturing fluid prepared herein was maintained above 60 mPa·s after sheared at 180° C. and 170 s$^{-1}$ for 120 min, indicating that the gel fracturing fluid can be applied to the site construction.

After the gel breaking at 70° C. in the presence of a gel breaker for 4 h, the viscosity of the fracturing fluid and the residue content were measured, and the results were shown in Table 1.

Comparative Example 1

Preparation of Conventional Organic Boron Crosslinker and Boron Crosslinked Guar Gum Gel Containing the Same 1. Preparation of Conventional Organic Boron Crosslinker Boric acid and ethylene glycol were added to a three-necked round-bottomed flask equipped with a water separator and a condensing reflux device refluxed under magnetic stirring until no water was generated to obtain a reaction mixture, where a molar ratio of boric acid to ethylene glycol was 1:4. The reaction mixture was cooled to room temperature and then treated with a 20 wt % sodium hydroxide solution to obtain a conventional organic boron crosslinker.

2. Preparation of Conventional Boron Crosslinked Guar Gum Gel (S1) Preparation of 0.2 wt % Guar Gum Base Fluid 0.2 part by weight of guar gum was slowly added into 99.8 parts by weight of water followed by stirring for 30 min to obtain a guar gum base fluid, which was allowed to stand for swelling.

(S2) After the guar gum was completely swollen, the guar gum base fluid was added with 0.8 wt % of a clay stabilizer, 0.1 wt % of a bactericide and 0.1 wt % of a pH regulator, and then added with 0.4 wt % of the conventional organic boron crosslinker and evenly mixed to prepare a boron crosslinked guar gum gel.

Figure 7:
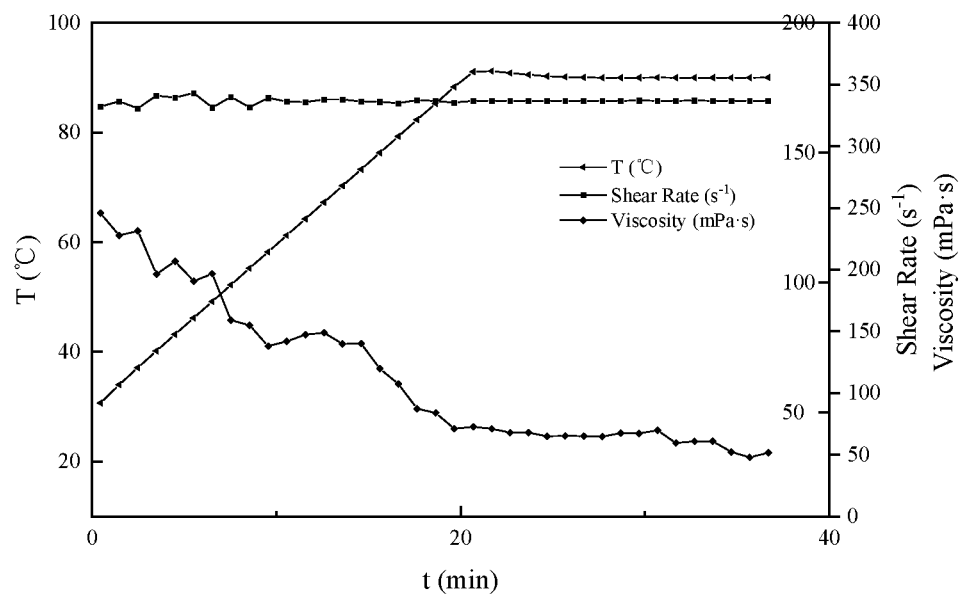
FIG. 7 shows a rheological curve of a conventional boron-crosslinked guar gum fracturing fluid according to Comparative Example 1 of the present disclosure.

Referring to FIG. 7, it showed that the viscosity of the boron crosslinked guar gum gel prepared herein was reduced below 50 mPa·s after sheared at 90° C. and 170 s$^{-1}$ for 40 min, indicating that the boron crosslinked guar gum gel fails to be applied to the site construction.

After the gel breaking at 70° C. in the presence of a gel breaker for 4 h, the viscosity of the fracturing fluid and the residue content were measured, and the results were shown in Table 1.

Comparative Example 2

Preparation of Conventional Organic Boron Crosslinker and Boron Crosslinked Guar Gum Gel Containing the Same 1. Preparation of Conventional Organic Boron Crosslinker Boric acid and ethylene glycol were added to a three-necked round-bottomed flask equipped with a water separator and a condensing reflux device and refluxed under magnetic stirring until no water was generated to obtain a reaction mixture, where a molar ratio of boric acid to ethylene glycol was 1:4. The reaction mixture was cooled to room temperature, and then treated with a 20 wt % of sodium hydroxide solution to obtain a conventional organic boron crosslinker.

2. Preparation of Conventional Boron Crosslinked Guar Gum Gel (S1) Preparation of 0.25 wt % Guar Gum Base Fluid 0.25 part by weight of guar gum was slowly added into 99.75 parts by weight of water followed by stirring for 30 min to obtain a guar gum base fluid, which was allowed to stand for swelling.

(S2) After the guar gum was completely swollen, the guar gum base fluid was added with 0.8 wt % of a clay stabilizer, 0.1 wt % of a bactericide and 0.1 wt % of a pH regulator, and then added with 0.5 wt % of the conventional organic boron crosslinker, and evenly mixed to prepare the boron crosslinked guar gum gel.

Figure 8:
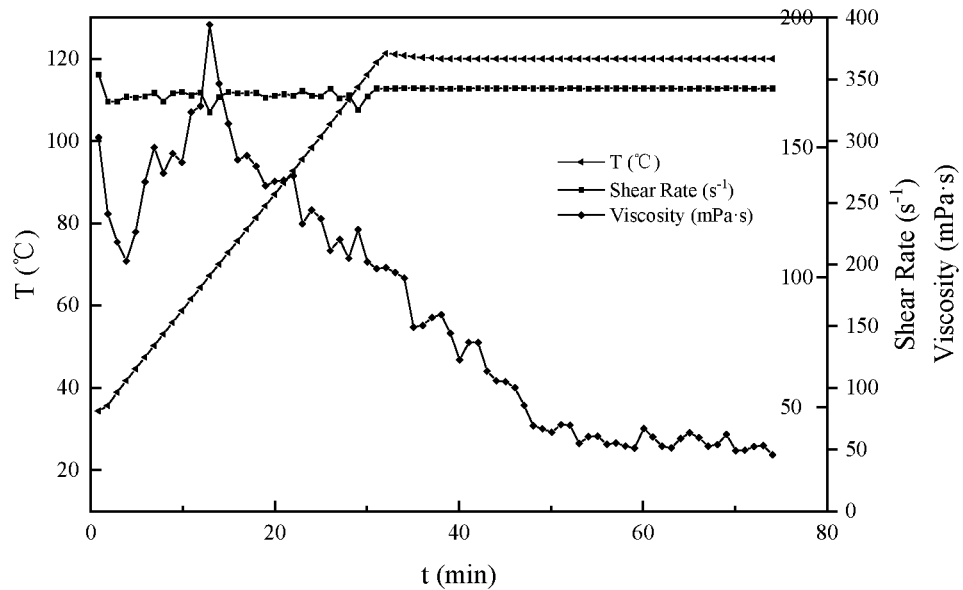
FIG. 8 shows a rheological curve of a conventional boron-crosslinked guar gum fracturing fluid according to Comparative Example 2 of the present disclosure.

Referring to FIG. 8, it showed that the viscosity of the boron crosslinked guar gum gel prepared herein was reduced below 50 mPa·s after sheared at 120° C. and 170 s$^{-1}$ for 80 min, indicating that the boron crosslinked guar gum gel fails to be applied to the site construction.

After the gel breaking at 70° C. in the presence of a gel breaker for 4 h, the viscosity of the fracturing fluid and the residue content were measured, and the results were shown in Table 1.

Comparative Example 3

Preparation of Conventional Organic Boron Crosslinker and Boron Crosslinked Guar Gum Gel Containing the Same 1. Preparation of Conventional Organic Boron Crosslinker Boric acid and ethylene glycol were added to a three-necked round-bottomed flask equipped with a water separator and a condensing reflux device and refluxed under magnetic stirring until no water was generated to obtain a reaction mixture, where a molar ratio of boric acid to ethylene glycol was 1:4. The reaction mixture was cooled to room temperature, and then treated with a 20 wt % of a sodium hydroxide solution to obtain a conventional organic boron crosslinker.

2. Preparation of Conventional Boron Crosslinked Guar Gum Gel (S1) Preparation of 0.36 wt % Guar Gum Base Fluid 0.36 part by weight of guar gum was slowly added into 99.64 parts by weight of water followed by stirring for 30 min to obtain a guar gum base fluid, which was allowed to stand for swelling.

(S2) After the guar gum was completely swollen, the guar gum base fluid was added with 0.8 wt % of a clay stabilizer, 0.1 wt % of a bactericide and 0.1 wt % of a pH regulator, and then added with 0.6 wt % of the conventional organic boron crosslinker, and evenly mixed to prepare the boron crosslinked guar gum gel.

Figure 9:
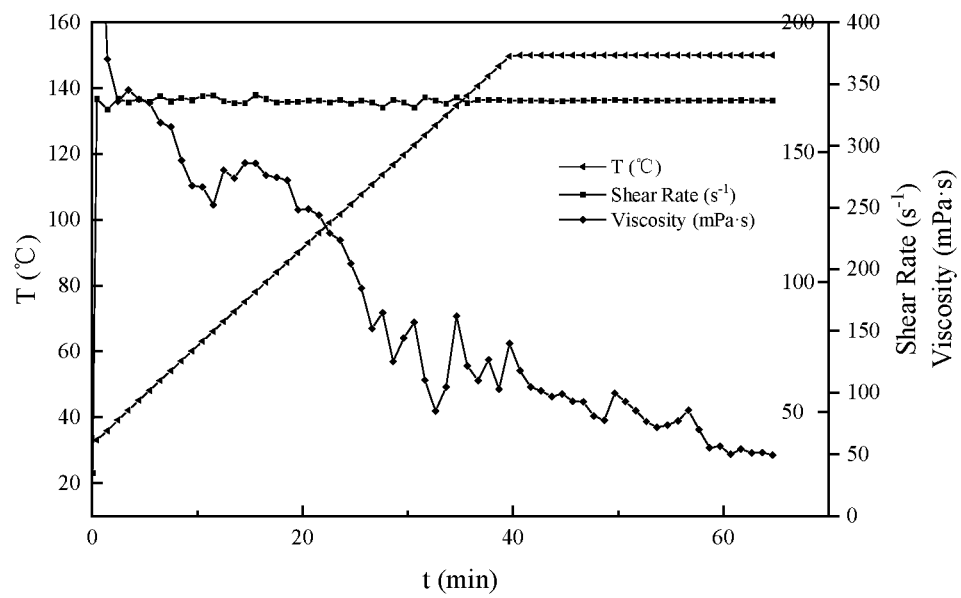
FIG. 9 shows a rheological curve of a conventional boron-crosslinked guar gum fracturing fluid according to Comparative Example 3 of the present disclosure.

Referring to FIG. 9, it showed that the viscosity of the boron crosslinked guar gum gel prepared herein is reduced below 50 mPa·s after sheared at 150° C. and 170 s$^{-1}$ for 70 min, indicating that the boron crosslinked guar gum gel fails to be applied to the site construction.

After the gel breaking at 70° C. in the presence of a gel breaker for 4 h, the viscosity of the fracturing fluid and the residue content were measured, and the results were shown in Table 1.

Comparative Example 4

Preparation of Conventional Organic Boron Crosslinker and Boron Crosslinked Guar Gum Gel Containing the Same 1. Preparation of Conventional Organic Boron Crosslinker Boric acid and ethylene glycol were added to a three-necked round-bottomed flask equipped with a water separator and a condensing reflux device and refluxed under magnetic stirring until no water was generated to obtain a reaction mixture, where a molar ratio of boric acid to ethylene glycol was 1:4. The reaction mixture was cooled to room temperature, and then treated with a 20 wt % of a sodium hydroxide solution to obtain a conventional organic boron crosslinker.

2. Preparation of Conventional Boron Crosslinked Guar Gum Gel (S1) Preparation of 0.5 wt % of a Guar Gum Base Fluid 0.5 part by weight of guar gum was slowly added into 99.5 parts by weight of water followed by stirring for 30 min to obtain a guar gum base fluid, which was allowed to stand for swelling.

(S2) After the guar gum was completely swollen, the guar gum base fluid was added with 0.8 wt % of a clay stabilizer, 0.1 wt % of a bactericide and 0.1 wt % of a pH regulator, and then added with 0.8 wt % of the conventional organic boron crosslinker, and evenly mixed to prepare a boron crosslinked guar gum gel.

Figure 10:
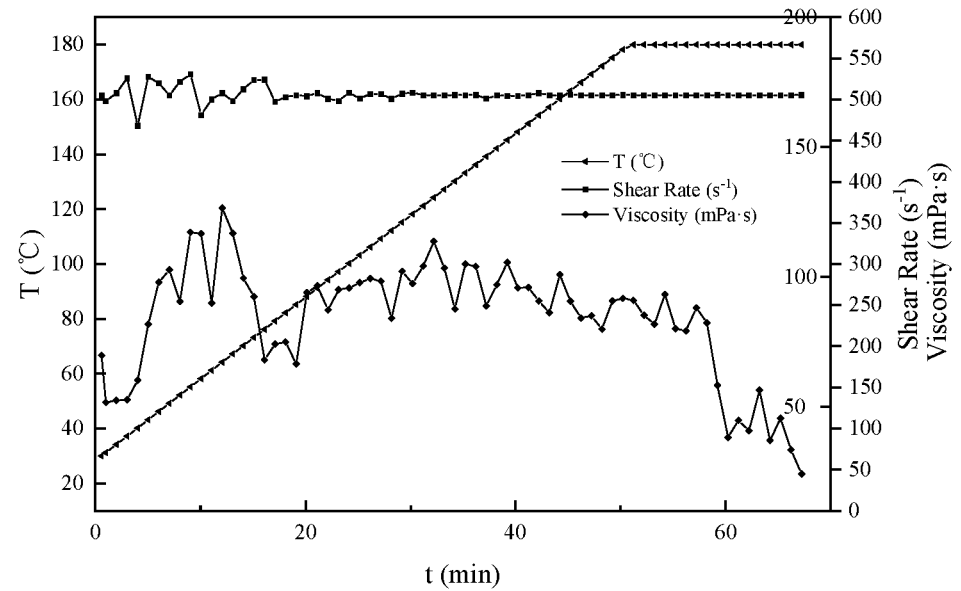
FIG. 10 shows a rheological curve of a conventional boron-crosslinked guar gum fracturing fluid according to Comparative Example 4 of the present disclosure.

Referring to FIG. 10, it showed that the viscosity of the boron crosslinked guar gum gel prepared herein was reduced below 50 mPa·s after sheared at 180° C. and 170 s$^{-1}$ for 70 min, indicating that the boron crosslinked guar gum gel fails to be applied to the site construction.

After the gel breaking at 70° C. in the presence of a gel breaker for 4 h, the viscosity of the fracturing fluid and the residue content were measured, and the results were shown in Table 1.

TABLE 1

Test results of properties of gel fracturing fluid

| Gel fracturing fluid | Viscosity after gel breaking (mPa · s) | Residue content in gel-breaking fluid (mg/L) |
|---|---|---|
| Example 1 | 1.96 | 188 |
| Example 2 | 2.20 | 250 |
| Example 3 | 2.21 | 374 |
| Example 4 | 3.45 | 514 |
| Comparative Example 1 | 1.85 | 184 |
| Comparative Example 2 | 2.03 | 242 |
| Comparative Example 3 | 2.25 | 398 |
| Comparative Example 4 | 3.78 | 496 |

It can be concluded from the data in Table 1 that compared with Comparative Examples 1-4, the gel fracturing fluid prepared in each of Examples 1-4 has similar viscosity and residue content in the gel-breaking fluid after gel breaking. The amount of guar gum is the main factor affecting the viscosity and residue content of the gel-breaking fluid. Under the same amount of guar gum, the temperature resistance of the gel fracturing fluid prepared in each of Examples 1-4 is significantly improved, while the viscosity and residue content of the gel-breaking fluid will not be significantly improved, so as to facilitate the flowback of the gel-breaking fluid.

What is claimed is:

1. A spherical organic nano boron crosslinker with a polyamidoamine (PAMAM) core, wherein a chemical structure of the spherical organic nano boron crosslinker is shown as follows:

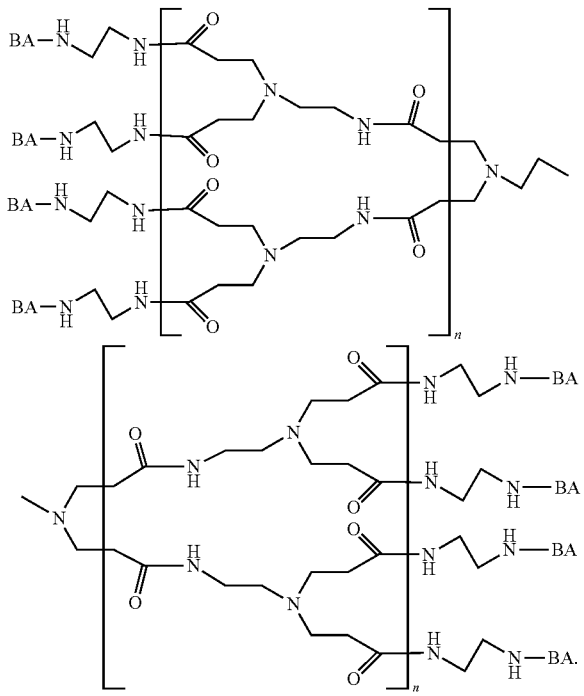

wherein n=0, 1, 2 or 3; and

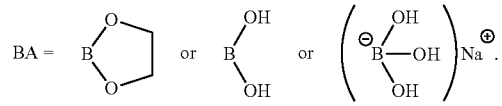

2. A method of preparing the spherical organic nano boron crosslinker of claim 1, comprising:
- (S1) mixing a boride with ethylene glycol followed by refluxing under stirring until no water is generated to obtain a reaction mixture, wherein a molar ratio of the boride to ethylene glycol is 1:(2-10); and cooling the reaction mixture to room temperature to obtain an intermediate A;
- (S2) subjecting ethylenediamine or a first whole-generation PAMAM as a central core to Michael addition reaction with methyl acrylate to prepare a half-generation PAMAM;
- (S3) subjecting the half-generation PAMAM and ethylenediamine to an amidation reaction to prepare a second whole-generation PAMAM; and
- (S4) reacting the second whole-generation PAMAM with the intermediate A followed by treatment with sodium hydroxide to prepare the spherical organic nano boron crosslinker.

3. The method of claim 2, wherein in step (S1), the boride is boric acid or borax.

4. The method of claim 2, wherein in step (S2), a molar ratio of the ethylenediamine or the first whole-generation PAMAM to the methyl acrylate is 1:(8-64).

5. The method of claim 2, wherein in step (S3), a molar ratio of the half-generation PAMAM to the ethylenediamine is 1:(20-50).

6. The method of claim 2, wherein in step (S4), a molar ratio of the second whole-generation PAMAM to the intermediate A is 1:(4-32).

7. The method of claim 2, wherein in step (S4), the second whole-generation PAMAM is reacted with the intermediate A at 140° C.-150° C. for 3-5 h.

8. The method of claim 7, wherein in step (S4), the second whole-generation PAMAM is reacted with the intermediate A at 150° C. for 4 h.

9. A gel fracturing fluid, comprising:
the spherical organic nano boron crosslinker of claim 1.

10. The gel fracturing fluid of claim 9, comprising:
0.4 wt %-0.8 wt % of the spherical organic nano boron crosslinker.

* * * * *